United States Patent [19]

Nagaoka et al.

[11] Patent Number: 5,296,533
[45] Date of Patent: Mar. 22, 1994

[54] THERMOPLASTIC RESIN COMPOSITION HAVING IMPROVED RESISTANCE TO DISCOLORATION FROM SUNLIGHT

[75] Inventors: Kenji Nagaoka; Hiroshi Hagimori, both of Ichihara; Yasurou Suzuki, Kisarazu; Takashi Sanada, Ichihara; Etsuji Okumura, Yotsukaido, all of Japan

[73] Assignee: Sumitomo Chemical Company, Limited, Osaka, Japan

[21] Appl. No.: 967,842

[22] Filed: Oct. 28, 1992

Related U.S. Application Data

[63] Continuation-in-part of Ser. No. 791,734, Nov. 14, 1991.

[51] Int. Cl.$^5$ .................. C08J 5/10; C08K 3/18; C08K 3/22; C08L 71/12
[52] U.S. Cl. .................. 524/430; 524/156; 524/423; 524/436; 524/449; 525/133; 525/397
[58] Field of Search ............ 524/156, 423, 449, 430, 524/436; 525/133, 397

[56] References Cited

U.S. PATENT DOCUMENTS

| | | | |
|---|---|---|---|
| 4,315,086 | 2/1982 | Ueno et al. | 525/391 |
| 4,529,761 | 7/1985 | Lohmeijer | 524/157 |
| 4,743,651 | 5/1988 | Shibuya et al. | 525/92 |
| 5,059,646 | 10/1991 | Morioka et al. | 524/142 |

FOREIGN PATENT DOCUMENTS

| | | |
|---|---|---|
| 0183195 | 6/1986 | European Pat. Off. . |
| 0231626 | 8/1987 | European Pat. Off. . |
| 0304041 | 2/1989 | European Pat. Off. . |
| 0375177 | 6/1990 | European Pat. Off. . |

Primary Examiner—Paul R. Michl
Assistant Examiner—U. K. Rajguru
Attorney, Agent, or Firm—Cushman, Darby & Cushman

[57] ABSTRACT

A resin composition having improved resistance to discoloration by sunlight comprising (A) a polymer mixture which comprises a polyphenylene ether, a polyamide and optionally a polystyrene and/or an agent to improve the impact resistance, and (B) an inorganic powder whose mean particle size is less than or equql to 5 micrometer, in an amount of more than or equal to 15 parts by weight based on 100 parts by weight of the polyphenylene ether in the polymer mixture (A), which is selected from the group consisting of titanium oxide, mica coated with titanium oxide, barium sulphate, zinc oxide and zinc sulfide.

5 Claims, No Drawings

THERMOPLASTIC RESIN COMPOSITION HAVING IMPROVED RESISTANCE TO DISCOLORATION FROM SUNLIGHT

This is a continuation-in-part of application Ser. No. 07/791,734, filed Nov. 14, 1991.

The present invention relates to a resin composition having improved resistance to discoloration by sunlight, which comprises a polyphenylene ether, a polyamide, an inorganic powder and optionally a polystyrene and/or an agent to improve impact resistance.

Resin compositions comprising a polyphenylene ether, a polyamide and optionally a polystyrene and/or an agent to improve impact resistance have been known for a long time, and it is also known that they show good thermal and mechanical properties, especially when having a controlled morphology which can be attained by use of some agents to improve the compatibility of the polyphenylene ether and the polyamide, and are being widely applied to practical uses. However, the resin compositions comprising a polyphenylene ether, a polyamide and optionally a polystyrene and/or an agent to improve impact resistance have poor resistance to discoloration by sunlight primarily caused by discoloring of polyphenylene ether, which restricts the extension of their application.

There are lots of proposals aiming to improve the weatherability or thermal stability of the polyphenylene ether or the resinous composition thereof. For instance, U.S. Pat. No. 4,489,186 discloses a resin composition comprising a polyphenylene ether, an organic phosphite and an oxanilide, and JP-A-61062545 discloses a resin composition comprising a polyphenylene ether, a polystyrene, a ZnO and Ni compound. However, said compositions have no resistance to discoloration by weathering, though they show improved resistance to the drop in mechanical properties by it. U.S. Pat. No. 4,695,601 discloses a resin composition comprising a polyphenylene ether and an alfa-hydrogen ketone, and JP-A-59122543 discloses a resin composition comprising a polyphenylene ether, a magnesium hypophosphite and an organic phosphonite compound. Although said compositions are improved in the resistance to discoloration during processing, they have no merit in the resistance to discoloration caused by sunlight. Thus, presently, there is few resin composition comprising a polyphenylene ether as a resin constituent which is good in the resistance to discoloration by sunlight.

The object of this invention is to provide a resin composition excellent in mechanical properties and resistance to discoloration by sunlight comprising a polyphenylene ether and a polyamide.

Under such a situation, the present inventors conducted elaborated studies to achieve the above-mentioned object, and found that specific inorganic powders exhibit a specially good effect in reducing discoloration by sunlight when incorporated into the mixture of polyphenylene ether and polyamide by specific quantity. The present invention was accomplished based on this finding.

Thus, the present invention provides a resin composition having improved resistance to discoloration by sunlight comprising (A) a polymer mixture which comprises a polyphenylene ether, a polyamide and optionally a polystyrene and/or an agent to improve the impact resistance, and (B) an inorganic powder whose mean particle size is less than or equal to 5 micrometer, in an amount of more than or equal to 15 parts by weight based on 100 parts by weight of the polyphenylene ether in the polymer mixture (A), which is selected from the group consisting of titanium oxide, mica coated with titanium oxide, barium sulphate, zinc oxide and zinc sulfide.

DETAILED DESCRIPTION OF THE INVENTION

As used herein, the term "polyphenylene ether (A)" means a polymer constituted of a recurring unit represented by the following general formula:

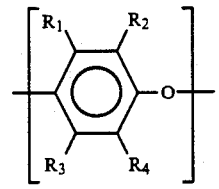

wherein $R_1$, $R_2$, $R_3$ and $R_4$ each represents identical or different group selected from the group consisting of hydrogen atom, halogen atom, hydrocarbon group, substituted hydrocarbon group, hydrocarbon-oxy group and substituted hydrocarbon-oxy group. Examples of the substituent in the substituted hydrocarbon group and substituted hydrocarbon-oxy group include thermally stable groups such as halogen atom, hydroxyl group, amino group, nitro group, cyano group, ester group, amido group, ether group, sulfide group, sulfone group and the like.

Concrete examples of said polyphenylene ether resin include poly(2,6-dimethyl-1,4-phenylene ether), poly(2,6-diethyl-1,4-phenylene ether), poly (2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dibutyl-1,4-phenylene ether), poly (2,6-dipropynyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly (2-methoxy-6-ethoxy-1,4-phenylene ether), poly(2-ethyl-6-stearyloxy-1,4-phenylene ether), poly(2-methyl-6-phenyl-1,4-phenylene ether), poly(2-methyl-1, 4-phenylene ether), poly(2-ethoxy-1,4-phenylene ether), poly(2-chloro-1,4-phenylene ether), poly(3-methyl-6-t-butyl-1,4-phenylene ether), poly(2,6-dichloro-1,4-phenylene ether), poly(2,5-dibromo-1,4-phenylene ether), poly(2,6-dibenzyl-1,4-phenylene ether), and various copolymers having plural kinds of recurring units constituting these polymers. The copolymers also include copolymers formed between poly-substituted phenols such as 2,3,6-trimethylphenol, 2,3,5,6-tetramethylphenol and the like and 2,6-dimethyl-phenol, and the like. The "polyphenylene ether resin" referred to in this invention also includes graft-modified products of polyphenylene ether resin prepared by graft-modifying the above-mentioned polyphenylene ether resins with a styrene-type monomer such as styrene, α-methyl-styrene and the like. Among these polyphenylene ether resins, poly(2,6-dimethyl-1,4-phenylene ether) and 2,6-dimethylphenol/2,3,6-trimethylphenol copolymer are preferable.

Although molecular weight of the polyphenylene ether resin usable in this invention cannot be simply specified because desirable molecular weight range varies depending on the purpose, it is usually 0.1 to 0.7 dl/g and preferably 0.2 to 0.6 dl/g, as expressed in terms of intrinsic viscosity measured in chloroform at 30° C.

The process for producing such polyphenylene ether resins is well known and mentioned in, for example, U.S. Pat. Nos. 3,306,874, 3,306,875 and 3,257,357, Japanese Patent Application Kokoku (Post. Exam.) No. 52-17880, Japanese Patent Application Kokai (Laid-Open) Nos. 50-51197 and 1-304119, etc.

The polyamide used in the present invention is at least one polyamide selected from crystalline aliphatic polyamides and aromatic polyamides.

The crystalline aliphatic polyamides used in the present invention include, for example, the following.

They have a molecular weight of 10,000 or more and can be produced by bonding equimolar of a saturated aliphatic dicarboxylic acid containing 4-12 carbon atoms and an aliphatic diamine containing 2-12 carbon atoms. In this case, if necessary, the diamine may be used so as to provide more amine terminal groups than carboxyl terminal groups in the polyamide, or alternatively, a dibasic acid may be used so as to provide more acid groups. Similarly, these polyamides can be produced from the above acid and acid production derivatives and amine production derivatives such as esters, acid chlorides and amine salts of the above mentioned acids and amines.

Typical examples of the aliphatic dicarboxylic acids used for production of the polyamides include adipic acid, pimelic acid, azelaic acid, suberic acid, sebacic acid and dodecanedioic acid. Typical examples of the aliphatic diamines include hexamethylenediamine and octamethylenediamine. Besides, these polyamides can also be produced by self-condensation of lactam.

Examples of the polyamides are polyhexamethylene adipamide (nylon 66), polyhexamethylene azelamide (nylon 69), polyhexamethylene sebacamide (nylon 610), polyhexamethylene dodecanoamide (nylon 612), poly-bis(p-aminocyclohexyl)methane dodecanoamide, polytetramethylene adipamide (nylon 46) and polyamides produced by ring cleavage of lactam such as polycaprolactam (nylon 6) and polylauryl lactam. Furthermore, there may be used polyamides produced by polymerization of at least two amines or acids used for production of the above-mentioned polymers, for example, polymers produced from adipic acid, sebacic acid and hexamethylenediamine. The polyamides further include blends of polyamides such as a blend of nylon 66 and nylon 6 including copolymers such as nylon 66/6.

Preferably, these crystalline polyamides used in the present invention are nylon 46, nylon 6, nylon 66, nylon 11 and nylon 12. More preferred are nylon 6, nylon 66 and blends of nylon 66 and nylon 6 at optional blending ratio.

Furthermore, those which have terminal functional groups excess in amine terminal groups, excess in carboxyl terminal groups or balanced in these groups, or mixtures of them at optional ratio can be suitably used.

The aromatic polyamides used in the present invention are copolyamides containing an aromatic component therein, for example, polyhexamethylene isophthalamide (nylon 6I). The thermoplastic copolyamides containing aromatic component means melt-polymerizable polyamides containing as a main component an aromatic amino acid and/or an aromatic dicarboxylic acid such as para-aminoethylbenzoic acid, terephthalic acid, and isophthalic acid.

Diamines which may constitute another component of the polyamdie include hexamethylenediamine, undecamethylenediamine, dodecamethylenediamine, 2,2,4-/2,4,4-trimethylhexamethylenediamine, m-xylylenediamine, p-xylylenediamine, bis(p-aminocyclohexyl)methane, bis(p-aminocyclohexyl)propane, bis(3-methyl-4-aminocyclohexyl)methane, 1,3-bis-(aminomethyl)cyclohexane, and 1,4-bis(aminomethyl)-cyclohexane. An isocyanate may also be used in place of the diamine. Examples of the isocyanate are 4,4′-diphenylmethane diisocyanate and tolylene diisocyanate.

Comonomers which are used, if necessary, have no limitation and examples of the comonomers are a unit of lactam, a unit of ω-amino acid of 4-12 carbon atoms, a compound derived from an aliphatic dicarboxylic acid of 4-12 carbon atoms and an aliphatic diamine of 2-12 carbon atoms, for example, lactams and amino acids such as ε-caprolactam, ω-laurolactam, 11-aminoundecanois acid, and 12-aminododecanoic acid, and equimolar salts of the above-mentioned various diamines and adipic acid. azelaci acid or sebacic acid.

Typical example of the thermoplastic aromatic copolyamides comprising these components are copolymer polyamide of p-aminomethylbenzoic acid and ε-caprolactam (nylon,AMBA/6), polyamides mainly composed of 2,2,4-/2,4,4-trimethylhexamethylene. terephthalamide (nylon TMDT and nylon TMDT/6I), polyamide mainly composed of hexamethylene.isophthalamide and/or hexamethylene.terephthalamide and containing, as a comonomer, bis(p-aminocyclohexyl) methane.isophthalamide and/or bis(p-aminocyclohexyl) methane.terephthalamide, bis(3-methyl-4-aminocyclohexyl) methane.isophthalamide and/or bis(3-methyl-4-aminocyclohexyl)methane.terephthalamide or bis(p-aminocyclohexyl) propane.isophthalamide and/or bis(p-aminocyclohexyl) propane.terephthalamide (nylon 6I/PACM I, nylon 6I/DMPACM I, nylon 6I/PACP I, nylon 6I/6T/PACM I/PACM T, nylon 6I/6T/DMPACM I /DMPACM T, nylon 6I/6T/PACP I/PACP T), polyamide mainly composed of hexamethylene.isophthalamide or hexamethylene.-terephthalamide and containing, as a comonomer, ε-caprolactam, 12-aminododecanoic acid, hexamethylene.adipamide, bis(p-aminocyclohexyl)methane.adipamide or bis(3-methyl-4-aminocyclohexyl)-methane.adipamide (nylon 6I, 6I/6T, 6I/12, 6T/6, 6T/66, 6I/PACM 6, 6I/DMPACM 6), and polyamides mainly composed of bis(p-aminocyclohexyl)methane.isophthalamide or bis(3-methyl-4-aminocyclohexyl) methane.isophthalamide and containing, as a comonomer, hexamethylene.dodecanedioamide or 12-aminododecanoic acid (nylon PACM I/612, nylon DMPACM I/12).

Of these aromatic polyamides, non-crystalline aromatic polyamides are suitable.

The constituent A in the invention is a polymer mixture comprising one or more of the aforementioned polyphenylene ethers, one or more of the aforementioned polyamides and optionally a polystyrene and/or an agent to improve impact resistance. The polymer mixture (A) favorable for the invention is a polymer mixture wherein the compatibility is enhanced by an appropriate measure, which is shown by the fact that the polyphenylene ether resides as a dispersed phase having a mean diameter of less than or equal to 5 micrometers in the polyamide as a continuous phase, so that the said polymer mixture can have better mechanical properties. The said mean diameter means a weight average diameter calculated from the electron microscopic photograph of the resin composition. The polyer mixture (A) more favorable for the invention comprises from 5 to 50% by weight of a polyphenylene ether, from 40 to 95% by weight of a polyamide, from 0 to 30% by weight of polystyrene and 0 to 30% by weight of an agent to improve the impact resistance.

The polystyrene as an optional constituent in the invention is a polymer derived from styrene and/or alpha-methyl styrene which may be modified with a rubber The agent to improve impact resistance as another optional constituent in the invention is an agent for improving the impact strength of polyphenylene ether-polyamide blend as described in EP-A-0236596, U.S. Pat. No. 4,315,086 and WO/85/05372, all incorporated herein by reference. Examples of the said agents include olefinic-based elastomers such as polyethylene, polybutadiene, polyisoprene, polyisobutylene, ethylene-propylene copolymer, ethylene-butene copolymer, ethylene-propylene-polyene terpolymer, ethylene-alkyl acrylate or methacrylate-maleic anhydride terpolymer, ethylene-glycidyl acrylate or methacrylate copolymer; styrene-based elastomers such as diblock copolymer, triblock copolymer and radical teleblock copolymer of styrene and conjugated diene, and partial hydride thereof; and modified elastomers of these grafted with styrene and/or unsaturated compounds having polar group. The agent to improve the impact resistance may be a mixture of plural agents described above.

The polymer mixture (A) in the present invention is well known in the art (U.S. Pat. No. 3,379,792 etc.), and those having enhanced compatibility are also well known and may be prepared by any of a number of methods using an agent to improve the compatibility of polyphenylene ether and polyamide. Examples of such polymer mixtures are disclosed in U.S. Pat. No. 4,315,086 and EP-A-236,596, incorporated herein by reference. As examples of the agent to improve the compatibility of polyphenylene ether and polyamide, there may be given as follows:

A) liquid diene polymers or epoxy compounds or compounds having in their molecular structure a double or triple carbon-to-carbon bond and a carboxylic acid, acid anhydride, acid amide, imido, carboxylic acid ester, amino or hydroxyl group in a quantity of from 0.01 to 30 parts by weight per 100 parts by weight of polyamide plus polyphenylene ether.

B) a functionalised polyphenylene ether consisting of the reaction product of (a) a polyphenylene ether and (b) a compound of the general formula (i)—Z—(ii), wherein (i) is at least a group of the formula [X—C—(O)] with X=F, Cl, Br, I, OH, —OR, or —O—C(O)—R with R=H, alkyl or aryl, wherein (ii) is at least a carboxylic acid, acid anhydride, acid amide, imido, carboxylic acid ester, amino or hydroxyl group, and in which the groups (i) and (ii) are covalently bonded together via a bridge Z, Z being a bivalent hydrocarbon radical.

C) a silane compound having in its molecular structure both (a) at lest one silicon atom which is bonded to a carbon atom via an oxygen bridge and (b) at least an ethylenic carbon-to-carbon double bond or a carbon-to-carbon triple bond and/or a functional group selected from an amine group and a mercapto group, the functional group not being bonded directly to the silicon atom, in a quantity of from 0.05 to 4 parts by weight per 100 parts by weight of polyamide plus polyphenylene ether.

D) an oxidized polyolefin wax, optionally in combination with an organic phospite, in a quantity of from 0.01 to 10 parts by weight per 100 parts by weight of polyamide plus polyphenylene ether.

E) a copolymer with units of a vinylaromatic compound and of an alpha-beta unsaturated dicarboxylic acid or dicarboxylic acid anhydride or a copolymer with units of vinylaromatic compound and of an imide compound of an alpha-beta unsaturated dicarboxylic acid, in a quantity of from 0.5 to 100 parts by weight per 100 parts by weight of polyamide plus polyphenylene ether.

F) the reaction product of a) a 1,2-substituted olefininc compound with carboxyl group or acid anhydride group, b) a polyphenylene ether and c) a radical initiator, in a quantity of from 0.5 to 150 parts by weight per 100 parts by weight of polyamide plus polyphenylene ether.

The agent for improving the compatibility mentioned sub B) or sub F) can replace the polyphenylene ether in the polymer mixtures according to invention entirely or partly.

The inorganic powder (B) in the invention is a powder preferably having a mean particle size of less than or equal to 5, preferably 1, more preferably 0.5 micrometer, of an inorganic solid selected from the group consisting of titanium oxide, mica coated with titanum oxide, barium sulphate, zinc oxide and zinc sulfide, said mean particle size meaning a median diameter which might be measured by a method such as sieving, sedimentation or microscopic observation.

The more prefarable inorganic powder (B) is titanium oxide.

The inorganic powder (B) is used in an amount of more than or equal to 15, preferably 20 and more preferably 30 parts by weight based on 100 parts by weight of the polyphenylene ether used in the polymer mixture (A). When the amount of inorganic powder (B) is less than 15 parts by weight based on 100 parts by weight of the polyphenylene ether, less improved resistance to discoloration is obtained, unfaborably. Although the upper side of the amount of inorganic powder (B) is not limited particularly, an amount of less than or equal to 50 parts by weight based on 100 parts by weight of the polymer mixturer (A) is favorable from the viewpoint of physical properties of the resin composition.

The method for producing the resin compositions of the present invention is not particularly limited, and the conventional methods are satisfactorily employed. Generally, however, melt blending methods are disirable. Any of the melt-blending methods may be used, if it can handle a molten viscous mass. The method may be applied in either a batchwise form or a contiuous form. Specifically, single screw extruders, twin screw extruders, Bambury mixers, rollers, kneaders and the like may be exemplified. The temperature required for melt-blending can properly be determined according to the composition of the material. It varies somewhat with the blending ratio of the polyphenylene ether to polyamide, but it is generally within a range of 200° to 350° C.

With respect to the order of compounding of ingredients, all ingredients may be directly added to the processing system or certain components may be precompounded with each other, but when an agent to improve the compatibility is used, it is preferable that at least the polyphenylene ether and the agent are precompounded. Such precompounding may be done in two steps wherein the polyphenylene ether and the agent to improve the compatibility are melt extruded to form pellets which are then blended through extrusion with the polyamide or one can employ an extrusion apparatus or melt blending apparatus wherein the polyphenylene ether and the agent to improve the compatibility are fed at the throat of the screw and the polyamide is subsequently added to the extrusion system in a downstream feed port. The inorganic powder (B) and, if used, other ingredients may be directly added to the processing system or certain ingredients may be precompounded with each other or either polymer product blending with the other polymer.

The following examples are presented in order that those skilled in the art may better understand how to practice the present invention. These examples are merely presented by way of illustration and are not intented to limit the invention thereto.

NIs in the Example are Notched Izod impact strengths measured according to ASTM D256.

$\Delta E$ in the Example is the value calculated according to CIE 1976 $L^* a^* b^*$ color difference formula with respect to the two sets of $L^*$-value, $a^*$-value and $b^*$-value obtained from the two set of specimens before and after being exposed to ultraviolet ray having a wave length ranged from 290 to 459 nm and an intensity of 100 mW/cm$^2$ at 63° C. for 100 hrs using Eysper UV Tester manufactured by Iwasaki Denki Co., Ltd., wherein the specimens (plaques of $40 \times 40 \times 3$ mm) were fabricated by injection molding from the resin composition and the color measurement was done using Macbeth Color Eye MS2020+ (spectrocolorimeter by Macbeth Co., Ltd.).

Unless otherwise stated, the term "parts" in Examples means "parts by weight".

The following designations are used for blend constituents:

PPE; poly(2,6-dimethyl-1,4-phenylene ether)[PPE H-46 from Nippon Polyether Co.,Ltd.]
PA; polyamide-6 [CAPRON XPN-1546 from AlliedSignal Co.,Ltd.]
SBS; styrene-butadiene-styrene triblock copolymer [CARIFLEX TR1101 from Shell Chemical Co.,Ltd.]
MAH; maleic anhydride as an agent to improve the compatibility.
HPA 817; black color concentrate manufactued by Sumika Color Co.,Ltd.
RG; radical generator composition where 1,3-bis (t-butylperoxyisopropyl)benzene is contained in polypropylene by the concentration of 8% by weight.
Preblend-I;
a preblend prepared using a Super Mixer comprising PPE, RG and, if used, MAH.
Preblend-II;
a preblend comprising PA, HPA817, inorganic powder(B) and, if used, SBS.

EXAMPLE 1

10 parts of PPE was fed to the feedthroat of a 50 mm Toshiba twin screw extruder which was set at 260° C., and was fitted with a downstream feed port. Preblend-II comprising 90 parts of PA, 0.3 part of HPA817 and 5 parts of titanium oxide having a mean particle size of about 0.3 micrometer was fed to the downstream feed port keeping the PPE/PA ratio in the melt-blend 10/90.

The resulting extruded strand was chopped into pellets and injection-molded into test pieces.

NI and $\Delta E$ of the test pieces are given in Table I.

COMPARATIVE EXAMPLE 1

The procedure of Example 1 was repeated without titanium oxide.

NI and $\Delta E$ of the test pieces are given in Table I.

EXAMPLES 2–8 AND COMPARATIVE EXAMPLES 2–3

The procedure of Example 1 was repeated, using Preblend-I and Preblend-II described in Table I, respectively.

NI and $\Delta E$ of the test pieces are given in Table I.

A very thin section of the test pieces of Example 2 was dyed with RuO$_4$, and then observed under an electron microscope of transmission type. It was found that there were polyphenylene ether particles with a mean diameter of about 1 $\mu$m finely dispersed in a continuous phase of polyamide.

The observation of Example 3 was repeated, and the result was similar to that of Example 2.

TABLE I

| | Preblend-I | | | Preblend-II | | | | | Result | |
|---|---|---|---|---|---|---|---|---|---|---|
| | PPE | MAH | RG | HPA817 | PA | SBS | Inorganic powder (B) | | NI | |
| No. | parts | parts | parts | parts | parts | part | Identity | parts | kg · am/cm | $\Delta E$ |
| Example 1 | 10 | — | — | 0.3 | 90 | — | TiO$_2$ | 5 | 2.5 | 4.4 |
| Comparative Example 1 | " | — | — | " | " | — | — | — | 2.8 | 8.2 |
| Example 2 | 15 | 0.3 | 0.05 | " | 85 | — | TiO$_2$ | 10 | 5.8 | 2.9 |
| Example 3 | " | " | " | " | 70 | 15 | " | " | 75 | 3.0 |
| Comparative Example 2 | " | " | " | " | " | " | " | 1.5 | 78 | 9.5 |
| Example 4 | 30 | " | " | " | 60 | 10 | " | 15 | 32 | 4.2 |
| Example 5 | 15 | " | " | " | 70 | 15 | TM $^{a)}$ | 10 | 13 | 3.5 |
| Example 6 | " | " | " | " | " | " | UF—TiO$_2$ $^{b)}$ | 5 | 78 | 5.1 |
| Comparative Example 3 | " | " | " | " | " | " | Talc | 10 | 14 | 8.6 |
| Example 7 | 40 | " | " | " | 50 | 10 | TiO$_2$ | 10 | 72 | 4.3 |
| Example 8 | 48 | " | " | " | 42 | " | " | " | 63 | 4.8 |
| | | | | | | | Zinc stearate | 0.2 | | |

$^{a)}$ TM: mica coated with TiO$_2$ from Merk Co.
$^{b)}$ UF—TiO$_2$: TiO$_2$ having a particle size of 0.02 micrometers.

We claim:

1. A resin composition having improved resistance to discoloration by sunlight, comprising (A) a polymer mixture which comprises a polyphenylene ether, a polyamide and optionally a polystyrene and/or an agent to improve impact resistance, and (B) an inorganic powder whose mean particle size is less than or equal to 5 micrometers, in an amount of more than or equal to 15 parts by weight based on 100 parts by weight of the polyphenylene ether in the polymer mixture (A), which is selected from the group consisting of titanium oxide, mica coated with titanium oxide, barium sulphate, zinc oxide and zinc sulfide.

2. A resin composition according to claim 1, wherein the polymer mixture (A) is a polymer mixture wherein the polyphenylene ether resides as a dispersed phase having a mean diameter of less than or equal to 5 micrometer in the polyamide as a continuous phase.

3. A resin composition according to claim 1 or 2, wherein the polymer mixture (A) comprises from 5 to 50% by weight of a polyphenylene ether, from 40 to 95% by weight of a polyamide, from 0 to 30% by weight of polystyrene and 0 to 30% by weight of an agent to improve impact resistance.

4. A resin composition according to claim 1, wherein the inorganic powder (B) is titanium oxide.

5. A resin composition according to claim 1, wherein the amount of an inorganic powder (B) is more than or equal to 20 parts by weight based on 100 parts by weight of the polyphenylene ether in the polymer mixture (A).

* * * * *